(12) United States Patent
Levola et al.

(10) Patent No.: US 9,200,779 B2
(45) Date of Patent: Dec. 1, 2015

(54) THREE-DIMENSIONAL DISPLAY FOR DISPLAYING VOLUMETRIC IMAGES

(75) Inventors: Tapani Kalervo Levola, Tampere (FI); Jyrki Sakari Kimmel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 448 days.

(21) Appl. No.: 13/699,474

(22) PCT Filed: May 25, 2010

(86) PCT No.: PCT/IB2010/052310
§ 371 (c)(1),
(2), (4) Date: Mar. 18, 2013

(87) PCT Pub. No.: WO2011/148226
PCT Pub. Date: Dec. 1, 2011

(65) Prior Publication Data
US 2013/0170177 A1 Jul. 4, 2013

(51) Int. Cl.
*F21V 9/16* (2006.01)
*G02B 27/22* (2006.01)
*H04N 13/04* (2006.01)

(52) U.S. Cl.
CPC .............. *F21V 9/16* (2013.01); *G02B 27/2285* (2013.01); *H04N 13/049* (2013.01)

(58) Field of Classification Search
CPC ................................ F21V 9/16; H04N 13/049
USPC ........................................................... 362/84
See application file for complete search history.

(56) References Cited

U.S. PATENT DOCUMENTS

| 5,684,621 A | 11/1997 | Downing ....................... 359/326 |
| 6,327,074 B1* | 12/2001 | Bass et al. ..................... 359/326 |
| 2004/0227694 A1 | 11/2004 | Sun et al. ........................... 345/6 |
| 2006/0192777 A1* | 8/2006 | Matsubara et al. ............ 345/419 |
| 2010/0066730 A1* | 3/2010 | Grossman ...................... 345/419 |
| 2013/0063438 A1* | 3/2013 | Billett et al. .................. 345/424 |

FOREIGN PATENT DOCUMENTS

| EP | 1 082 705 | 10/1999 |
| EP | 1 403 759 A2 | 3/2004 |
| EP | 1 709 617 A0 | 7/2005 |
| WO | WO 00/11513 | 3/2000 |
| WO | WO 02/33657 | 4/2002 |
| WO | WO 2007/127214 A2 | 11/2007 |

OTHER PUBLICATIONS

Canessa, "A Possible Scenario For Volumetric Display Through Nanoparticle Suspensions", (Jun. 18, 2001), (15 pages).
Konrad et al., "3-D Displays and Signal Processing: An Answer to 3-D Ills?", (2007), IEEE. (21 pages).

(Continued)

*Primary Examiner* — David V Bruce
(74) *Attorney, Agent, or Firm* — Harrington & Smith (57) ABSTRACT

An apparatus including a three-dimensional display, for displaying volumetric images, including a three-dimensional non linear photoluminescent medium defining a display volume and including nanostructures distributed throughout the display volume; and a scanner configured to scan an output volume, where a first photon flux and a second photon flux meet, in three dimensions within the display volume.

20 Claims, 4 Drawing Sheets

(56) References Cited

OTHER PUBLICATIONS

Brennan, Margaret, E., et al., "Nonlinear photoluminescence from van Hove singularities in multiwalled carbon nonatubes", Optics Letters, vol. 28, Issue 4, 1 pg.

Murakami, Y., et al., "Nonlinear Photoluminescence Excitation Spectroscopy of Carbon Nanotubes: Exploring the Upper Density Limit of One-Dimensional Excitions", © 2009 The American Physical Society, 4 pgs.

* cited by examiner

THREE-DIMENSIONAL DISPLAY FOR DISPLAYING VOLUMETRIC IMAGES

FIELD OF THE INVENTION

Embodiments of the present invention relate to a three-dimensional display.

BACKGROUND TO THE INVENTION

A three-dimensional effect display, such as an autostereoscopic display, may allow a user to focus on displayed image features in a plane. The same applies to all stereoscopic displays that are based on a substantially planar display surface, whether they employ user-specific viewing devices such as polarizing or time-synchronized eyeglass devices or alternatively, user tracking in the vicinity of the display device. Although the display provides an illusion of three-dimensional content, the user will experience discomfort due to the mismatch of vergence and focus that the stereoscopic planar displays provide.

A three-dimensional display may allow a user to focus on displayed image features that are within a three-dimensional display volume. The image is thus volumetric, and the focus-vergence mismatch is avoided. This situation is beneficial to the user's viewing comfort Current three-dimensional (volumetric) displays suffer from a number of problems. They are typically either very complex and expensive or only capable of providing very small display volumes. The expense usually is a result from complex mechanical systems employed in providing the image. Another source of excessive cost is the use of e.g. rare-earth ion-doped glass material that is sometimes used in small-scale volumetric display systems.

BRIEF DESCRIPTION OF VARIOUS EMBODIMENTS OF THE INVENTION

According to various, but not necessarily all, embodiments of the invention there is provided an apparatus comprising: a three-dimensional display, for displaying volumetric images, comprising a three-dimensional nonlinear photoluminescent medium defining a display volume and comprising nanostructures distributed throughout the display volume; and a scanner configured to scan an output volume, where a first photon flux and a second photon flux meet, in three dimensions within the display volume.

According to various, but not necessarily all, embodiments of the invention there is provided a method comprising: directing a first photon flux into a display volume of a three-dimensional nonlinear photoluminescent medium comprising nanostructures distributed throughout the display volume; directing a second photon flux into the display volume of the three-dimensional nonlinear photoluminescent medium; and scanning an output volume, where the directed first photon flux and the directed second photon flux meet, in three dimensions within the display volume.

According to various, but not necessarily all, embodiments of the invention there is provided an apparatus comprising: a three-dimensional display, for displaying volumetric images, comprising a three-dimensional nonlinear photoluminescent medium defining a display volume and comprising non-linear light emitters distributed throughout the display volume; and a scanner configured to scan an output volume, where a first photon flux and a second photon flux meet, in three dimensions within the display volume.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures illustrate an apparatus 2 comprising: a three-dimensional display 4, for displaying volumetric images, comprising a three-dimensional nonlinear photoluminescent medium 10 defining a display volume 12 and comprising nanostructures 14 distributed throughout the display volume 12; and a scanner 6 configured to scan an output volume 20, where a first photon flux 22 and a second photon flux 24 meet, in three dimensions within the display volume 12.

The nonlinearity of the photoluminescence of the three-dimensional nonlinear photoluminescent medium 10 is such that photoemission from the medium 10 where both the first photon flux 22 and the second photon flux 24 meet is significantly greater than photoemission from the medium 10 where only one of the first photon flux 22 and the second photon flux 24 is present. Consequently, where both the first photon flux 22 and the second photon flux 24 meet appears emissive (the output volume 20) compared to regions where only one of the first photon flux 22 and the second photon flux 24 is present.

Photoemission from the medium 10 where both the first photon flux 22 and the second photon flux 24 meet may be at least an order of magnitude greater than photoemission from the medium 10 where only one of the first photon flux 22 and the second photon flux 24 is present.

Figure 1:
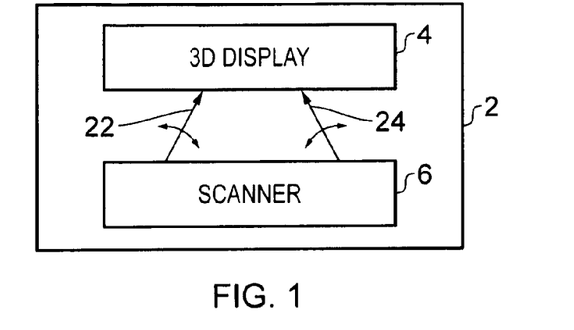
FIG. 1 schematically illustrates an apparatus comprising a three-dimensional display.
Figure 2:
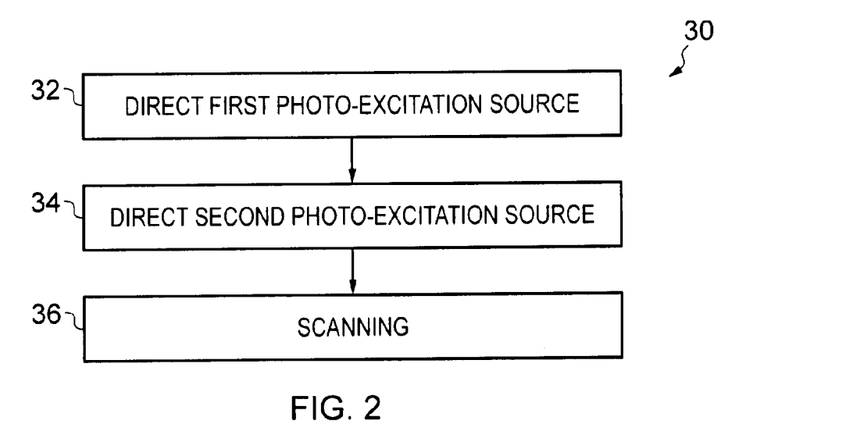
FIG. 2 schematically illustrates a method performed by the apparatus.

FIG. 1 schematically illustrates an apparatus 2 and FIG. 2 schematically illustrates a method performed by the apparatus 2.

At block 32, a first photon flux 22 is directed into a display volume 12 of a three-dimensional nonlinear photoluminescent medium 10 comprising nanostructures 14 distributed throughout the display volume 12. The first photon flux 22 may be an output from a light source such as, for example, a beam of collimated light.

At block 34, a second photon flux 24 is directed into the display volume 12 of the three-dimensional nonlinear photoluminescent medium 10. The second photon flux 24 may be an output from a light source such as, for example, a beam of collimated light.

At block 36, an output volume, where the directed first photon flux 22 and the directed second photon flux 24 meet, is scanned in three dimensions within the display volume 12.

Figure 3:
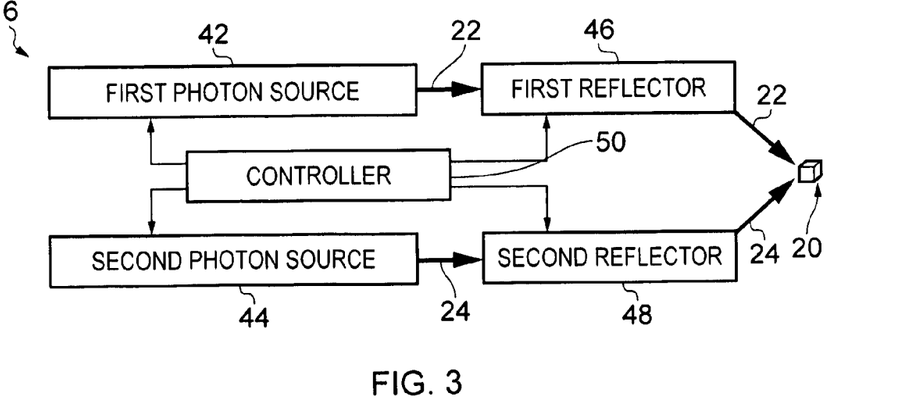
FIG. 3 schematically illustrates an example embodiment of the apparatus.

One example embodiment of the apparatus 2 is schematically illustrated in FIG. 3. In this Figure, the scanner 6 is illustrated in detail.

The scanner 6 comprises a first photon source 42 configured to provide photons forming the first photon flux 22 and a second photon source 44 configured to provide photons forming the second photon flux 24.

The scanner 6 additionally comprises a first reflector arrangement 46 configured to scan the first photon flux 22 within the display volume 12 and a second reflector arrangement 48 configured to scan the second photon flux 24 within the display volume 12.

A controller 50 is configured to control the scanner 6.

The controller 50 may, for example, be configured to synchronously control the first reflector arrangement 46 and the second reflector arrangement 48 so that the output volume 20 formed where the first photon flux 22 and the second photon flux 24 meet, is scanned in three dimensions within the display volume 12.

The controller 50 may, for example, also control a magnitude of the photon flux 22 and/or a magnitude of the photon flux 24.

The controller 50 may, for example, additionally or alternatively control photon energy of the first photon flux 22 by providing a command to the first photon flux 22 which then produces photons of the appropriate energy and/or control photon energy of the second photon flux 24 by providing a command to the second photon flux 24 which then produces photons of the appropriate energy.

Figure 4:
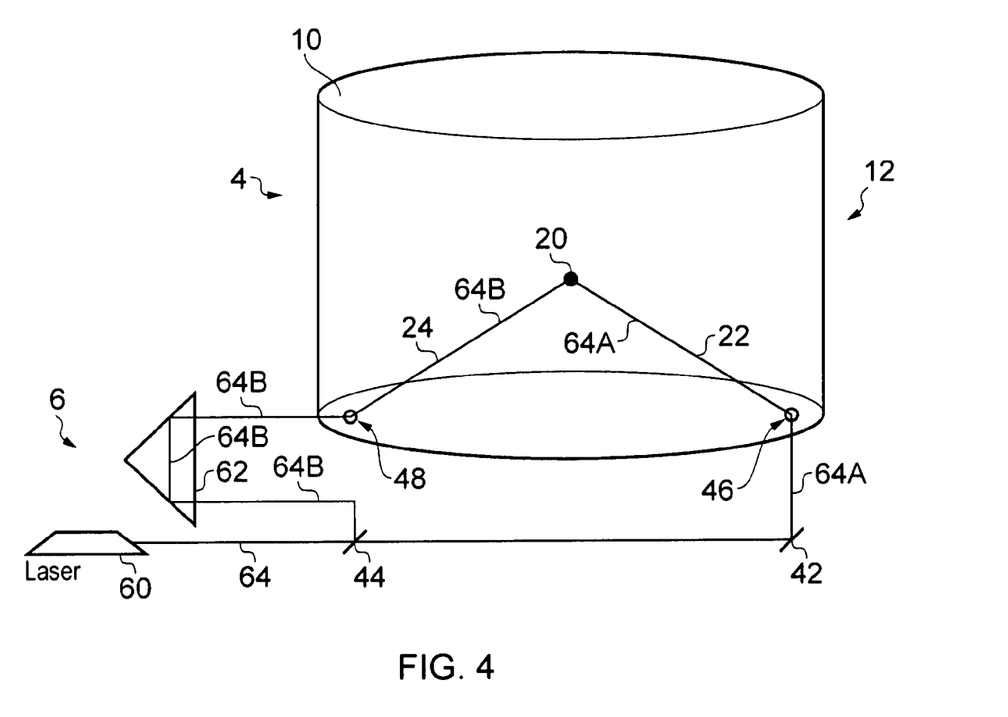
FIG. 4 schematically illustrates another example embodiment of the apparatus.

Another example embodiment of the apparatus 2 is schematically illustrated in FIG. 4. In this Figure, the scanner 6 is an example of one implementation of the scanner 6 illustrated in FIG. 3 and similar references are used for similar features.

The scanner 6 comprises a first photon source 42 for providing the first photon flux 22, a second photon source 44 for providing the second photon flux 24, a first reflector arrangement 46 and a second reflector arrangement 48 as described with reference to FIG. 3. The scanner may also comprise a controller 50 (not illustrated) as described with reference to FIG. 3.

In this example, a laser 60 produces a laser beam 64 which is incident on a beam-splitter 44 which splits the laser beam into a first beam 64A (first photon flux 22) and a second beam 64B (second photon flux 24). The beam-splitter 44 may, for example, be a half-reflective mirror that has a coating that reflects half and transmits half of the light. The first beam 64A and the second beam 64B therefore have substantially the same intensity.

The first beam 64A is reflected by a mirror 42 onto a first reflector arrangement 46. The first beam 64A is reflected by a movable mirror within the first reflector arrangement 46 into the output volume 20.

The second beam 64B is reflected by a mirror 44 onto a second reflector arrangement 48. The second beam 64B is reflected by a movable mirror within the second reflector arrangement 48 into the output volume 20.

A beam path length compensator 62 may be positioned in the light path of the second beam 64B. This extends the path length of the second beam 64B so that the path length from laser 60 to display volume 12 is substantially equal for the first and second beams 64A, 64B. The beam path length compensator 62 may be a prism.

In the illustrated example, the display volume 12 is cylindrical but in other embodiments it may be any appropriate three-dimensional shape. It may, for example, be cuboid or ellipsoid.

The first reflector arrangement 46 may comprise a micro-electro-mechanical (MEM) component that controls the position of a micro mirror for controlling where the first beam 64A is directed within the display volume 12.

The second reflector arrangement 48 may comprise a micro-electro-mechanical (MEM) component that controls the position of a micro mirror for controlling where the second beam 64B is directed within the display volume 12.

The controller 50 (FIG. 3) is configured to control synchronously the orientation of the mirror of the first reflector arrangement 46 and the mirror of the second reflector arrangement 48 to control the location of the output volume 20 and to scan that volume in three dimensions within the display volume 12.

Figure 5:
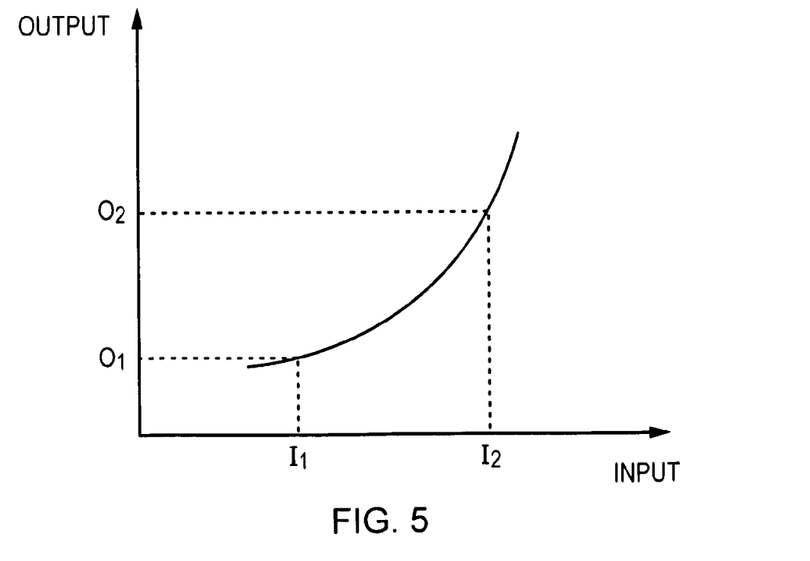
FIG. 5 schematically illustrates an example of a photoluminescent response for the three-dimensional display.

FIG. 5 schematically illustrates an example of a photoluminescent response for the three-dimensional nonlinear photoluminescent medium 10 that has nanostructures 14 distributed throughout. The response is illustrated graphically with the input light intensity (photo-excitation) along the horizontal x-axis and the output light intensity (photo-emission) along the vertical y-axis.

The nonlinearity of the response is such that photoemission (O) increases more with increasing photo-excitation (I). Photoemission increases more than linearly with increasing photo-excitation.

The nonlinearity of the response may be such that $$\frac{\partial O}{\partial I}$$

is a monotonically increasing function with respect to I. Photoemission may increase exponentially with intensity of photon flux.

The nonlinearity of the response may be such that photoemission (O) is substantially zero below a threshold value of the photo-excitation intensity (I) and is significantly large above the threshold.

In the Figure O1 represents the intensity of photoemission from the medium 10 where only one of the first photon flux 22 and the second photon flux 24 is present having an input intensity I1.

In the Figure O2 represents the intensity of photoemission from the medium 10 where both of the first photon flux 22 and the second photon flux 24 is present e.g. at an output volume 20. The input intensity is I2 (I2=I1+I1).

O2 is significantly greater than O1. Consequently, where both the first photon flux 22 and the second photon flux 24 meet appears emissive (the output volume 20) compared to regions where only one of the first photon flux 22 and the second photon flux 24 is present.

The photon energy of photoemission is less than the photon energy of photo-excitation.

Figure 6A:
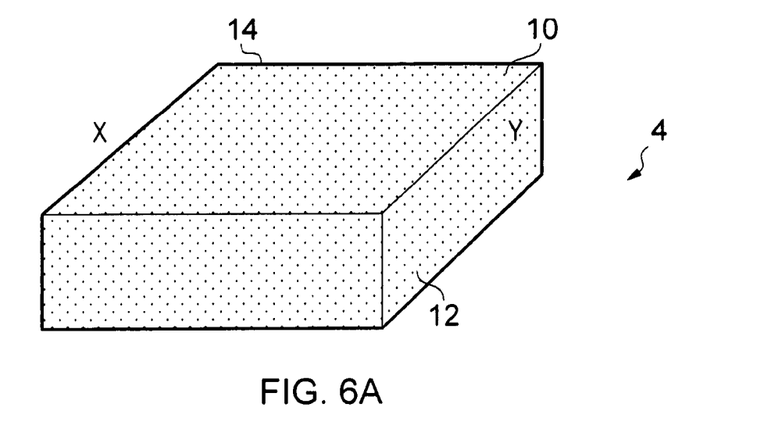
FIG. 6A schematically illustrates a perspective plan view of the three-dimensional display.

FIG. 6A schematically illustrates a perspective plan view of the three-dimensional display 4. It illustrates the distribution of nanostructures 14 throughout the display volume 12 of the medium 10.

Figure 6B:
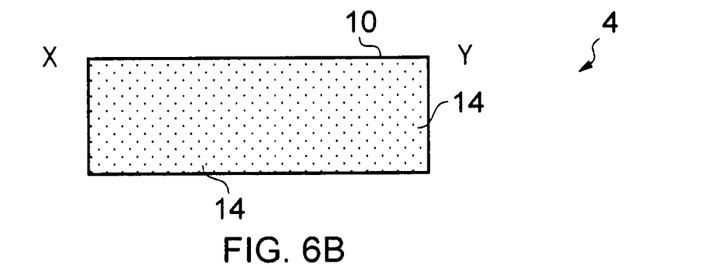
FIG. 6B schematically illustrates a cross-sectional view through the three-dimensional display illustrated in FIG. 6A.

FIG. 6B schematically illustrates a cross-sectional view through the three-dimensional display 4 illustrated in FIG. 6A along the line X-Y. It illustrates the distribution of nanostructures 14 throughout an interior region of the medium 10.

A nanostructure 14 is a structure with at least one physical dimension less than 1 μm.

The nanostructures 14 may be, for example, non-crystalline nanostructures; non-metallic nanostructures; carbon nanostructures or fullerene nanostructures.

The nanostructures 14 may be, for example, nanoparticles, nanotubes, nanowires or multiwall carbon nanotubes (MWNTs).

The supporting medium 10 may be, for example, a gas, fluid, gel, or solid.

For example, the three-dimensional display 4 may be formed from MWNTs 14 in glass or solidified polymer 10.

For example, the three-dimensional display 4 may be formed from inorganic salt nanocrystals 14 in gel 10.

For example, the three-dimensional display 4 may be formed from fullerenes 14 in glass 10.

Figure 7A:
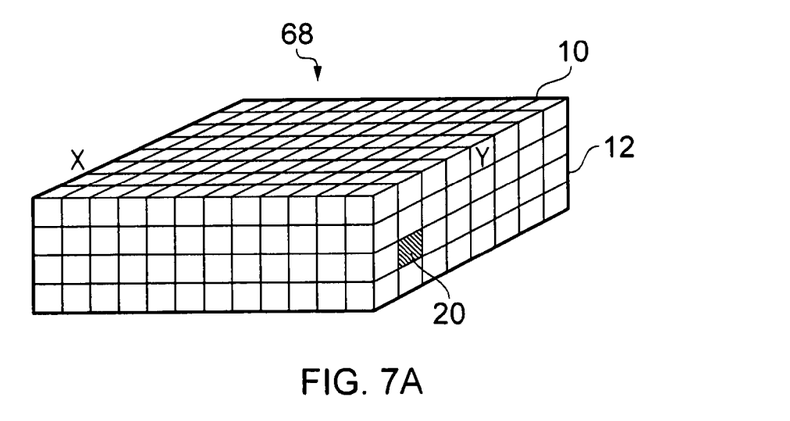
FIG. 7A schematically illustrates an example of a display volume logically divided into a three-dimensional array of potential output volumes.

FIG. 7A schematically illustrates an example of a display volume 12 logically divided into a three-dimensional array 68 of potential output volumes 20. Each of the potential output volumes of the three-dimensional array 68 may be scanned once in a predetermined time to produce a volumetric image.

The scanner 6 may be controlled to scan the output volume 20, where a first photon flux 22 and a second photon flux 24 meet, through a sub-set of the potential output volumes of the three-dimensional array 68 in the predetermined time. The scanner 6 may be controlled so that the first photon flux 22 and a second photon flux 24 do not meet at those potential output volumes of the three-dimensional array that are not part of the sub-set.

Figure 7B:
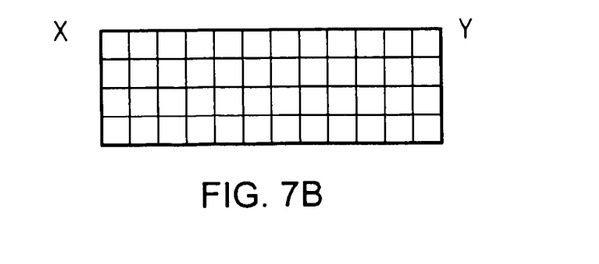
FIG. 7B schematically illustrates a cross-sectional view through the display volume illustrated in FIG. 7A.

FIG. 7B schematically illustrates a cross-sectional view through the display volume 12 illustrated in FIG. 7A along the line X-Y.

Figure 8:
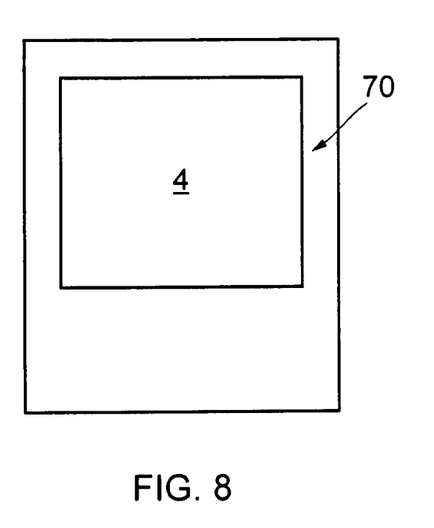
FIG. 8 schematically illustrates an example of the apparatus.

FIG. 8 schematically illustrates an example of the apparatus 2. In this example the apparatus 2 is a hand-portable device but in other embodiments it may be a different type of device. Examples of hand-portable devices include a mobile cellular telephone, a personal music player, a personal digital assistant, a camera etc. A hand-portable device is typically sized to fit into an internal breast pocket of a jacket and may be held within the palm of a hand. The apparatus 2 has a front face 70 occupied by the three-dimensional display 4. The area of the three-dimensional display 4 in the front face 70 is greater than nine square centimeters.

Implementation of the controller can be in hardware alone (a circuit, a processor, or a programmable logic array), have certain aspects in software including firmware alone or can be a combination of hardware and software (including firmware).

The controller may be implemented using instructions that enable hardware functionality, for example, by using executable computer program instructions in a general-purpose or special-purpose processor that may be stored on a computer readable storage medium (disk, memory etc) to be executed by such a processor.

The apparatus 2 illustrated in FIG. 1 may be a module. As used here 'module' refers to a unit or apparatus that excludes certain parts/components that would be added by an end manufacturer or a user.

Although embodiments of the present invention have been described in the preceding paragraphs with reference to various examples, it should be appreciated that modifications to the examples given can be made without departing from the scope of the invention as claimed.

For example, although in the preceding examples, the scanner 6 is configured to scan an output volume 20, where a first photon flux 22 and a second photon flux 24 meet, in three dimensions within the display volume 12. In other embodiments there may be more than two photon fluxes and more than two beams may meet in the output volume 20.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a three-dimensional display, for displaying volumetric images, comprising a three-dimensional nonlinear photoluminescent medium defining a display volume and comprising nanostructures distributed throughout the display volume; and
a scanner configured to scan an output volume, where a first photon flux and a second photon flux meet, in three dimensions within the display volume, wherein the nonlinearity of the photoluminescence of the three-dimensional nonlinear photoluminescent medium is such that a photoemission from the medium where beams forming the first photon flux and the second photon flux meet is greater than a combination of a non-zero photoemission from the medium where only the beam forming the first photon flux, and not the beam forming the second photon flux is present; and
a non-zero photoemission from the medium where only the beam forming the second photon flux, and not the beam forming the first photon flux is present,
such that where both the beams forming the first photon flux and the second photon flux meet appear emissive compared to regions where only one of the beams forming the first photon flux and the second photon flux is present.

2. An apparatus as claimed in claim 1, wherein the nonlinearity of the photoluminescence of the three-dimensional nonlinear photoluminescent medium is such that photoemission from the medium increases more with increasing photo-excitation and, wherein the nonlinearity of the photoluminescence of the three-dimensional nonlinear photoluminescent medium is such that photoemission from the medium increases discretely with intensity of photo-excitation or the rate of change of photoemission with intensity of photo-excitation increases monotonically with intensity of photo-excitation.

3. An apparatus as claimed in claim 1, wherein the nonlinearity of the photoluminescence of the three-dimensional nonlinear photoluminescent medium is such that photoemission from the medium where beams forming the first photon flux and the second photon flux meet is at least an order of magnitude greater than photoemission from the medium where only one of the beams forming the first photon flux and the second photon flux is present.

4. An apparatus as claimed in claim 1, wherein the nanostructures distributed throughout the display volume are selected from the group consisting of: non-crystalline nanostructures; nanocrystals; non-metallic nanostructures; carbon nanostructures and fullerene nanostructures.

5. An apparatus as claimed in claim 1, wherein the nanostructures distributed throughout the display volume are selected from the group consisting of: nanoparticles, nanotubes and multiwall carbon nanotubes (MWNTs).

6. An apparatus as claimed in claim 1, wherein the display volume is a cuboid, or a cylinder or an ellipsoid; or a section or a combination of one or more of these.

7. An apparatus as claimed in claim 1, wherein the apparatus is a hand-portable device having an area of a front face occupied by the three-dimensional display, wherein the area has a size greater than nine square centimeters.

8. An apparatus as claimed in claim 1, comprising a first photon source configured to provide photons forming the first photon flux and a second photon source configured to provide photons forming the second photon flux.

9. An Apparatus as claimed in claim 1, comprising a controller configured to control a magnitude of the first photon flux and/or a magnitude of a photon flux of the second photon flux.

10. An apparatus as claimed in claim 1, comprising a controller configured to control a photon energy of the first photon flux and/or a photon energy of the second photon flux.

11. An apparatus as claimed in claim 1, comprising:
a first reflector arrangement configured to scan a beam of the first photon flux within the display volume;
a second reflector arrangement configured to scan a beam of the second photon flux within the display volume; and
a controller configured to synchronously control the first reflector arrangement and the second reflector arrangement so that beams forming the first photon flux and the second photon flux meet in the defined output volume that is scanned in three dimensions within the display volume.

12. An apparatus as claimed in claim 1, wherein the display volume comprises a three-dimensional array of a plurality of potential output volumes that may each be scanned once in a predetermined time to produce a volumetric image.

13. An apparatus as claimed in claim 1, wherein the photon energy of photoemission is less than the photon energy of either the first photon flux or the second photon flux.

14. A method comprising:
directing a first photon flux into a display volume of a three-dimensional nonlinear photoluminescent medium comprising nanostructures distributed throughout the display volume;
directing a second photon flux into the display volume of the three-dimensional nonlinear photoluminescent medium; and
scanning an output volume, where the directed first photon flux and the directed second photon flux meet, in three dimensions within the display volume, wherein the nonlinearity of the photoluminescence of the three-dimensional nonlinear photoluminescent medium is such that a hotoemission from the medium where beams forming the first photon flux and the second photon flux meet is greater than a combination of a non-zero photoemission from the medium where only the beam forming the first photon flux, and not the beam forming the second photon flux is present; and a non-zero photoemission from the medium where only the beam forming the second photon flux, and not the beam forming the first photon flux is present,
such that where both the beams forming the first photon flux and the second photon flux meet appear emissive compared to regions where only one of the beams forming the first photon flux and the second photon flux is present.

15. A method as claimed in claim 14, further comprising controlling a photon flux of at least one of the first photon flux and the second photon flux.

16. A method as claimed in claim 14, further comprising controlling photon energy of at least one of the first photon flux and the second photon flux.

17. A method as claimed in claim 14, further comprising:
controlling a first reflector arrangement to scan a beam of the first photon flux within the display volume and a second reflector arrangement to scan a beam of the second photon flux within the display volume so that the beams forming the first photon flux and the second photon flux meet to define the output volume that is scanned in three dimensions within the display volume.

18. A method as claimed in claim 14, wherein the display volume comprises a three-dimensional array of a plurality of potential output volumes and a selected subset of the plurality of potential output volumes are each scanned once in a predetermined time to produce a volumetric image.

19. A method as claimed in claim 14, where both the beams forming the first photon flux and a second photon flux meet appear more emissive compared to emissive regions where only one of the beams forming the first photon flux and the second photon flux is present.

20. An apparatus comprising:
a three-dimensional display, for displaying volumetric images, comprising a three-dimensional nonlinear photoluminescent medium defining a display volume and comprising non-linear light emitters distributed throughout the display volume; and a scanner configured to scan an output volume, where a first photon flux and a second photon flux meet, in three dimensions within the display volume, wherein the nonlinearity of the photoluminescence of the three-dimensional nonlinear photoluminescent medium is such that a photoemission from the medium where beams forming the first photon flux and the second photon flux meet is greater than a combination of a non-zero photoemission from the medium where only the beam forming the first photon flux, and not the beam forming the second photon flux is present; and
a non-zero photoemission from the medium where only the beam forming the second photon flux, and not the beam forming the first photon flux is present,
such that where both the beams forming the first photon flux and the second photon flux meet appear emissive compared to regions where only one of the beams forming the first photon flux and the second photon flux is present.

* * * * *

UNITED STATES PATENT AND TRADEMARK OFFICE
CERTIFICATE OF CORRECTION

PATENT NO. : 9,200,779 B2  Page 1 of 1
APPLICATION NO. : 13/699474
DATED : December 1, 2015
INVENTOR(S) : Levola et al.

It is certified that error appears in the above-identified patent and that said Letters Patent is hereby corrected as shown below:

In the claims
Claim 14, col. 7, line 56, "hotoemission" should be deleted and --photoemission-- should be inserted.

Signed and Sealed this
Seventeenth Day of May, 2016

Michelle K. Lee
*Director of the United States Patent and Trademark Office*